(12) United States Patent
Bodapati et al.

(10) Patent No.: US 10,909,596 B2
(45) Date of Patent: *Feb. 2, 2021

(54) MANAGING TRANSACTION STATE DATA

(71) Applicant: Capital One Services, LLC, McLean, VA (US)

(72) Inventors: Chandra Sekhar Bodapati, Irving, TX (US); Vinod Chandrasekharan, Frisco, TX (US); Sadagopan Rajagopalan, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/290,608

(22) Filed: Mar. 1, 2019

(65) Prior Publication Data

US 2019/0340664 A1 Nov. 7, 2019

Related U.S. Application Data

(63) Continuation of application No. 15/971,170, filed on May 4, 2018, now Pat. No. 10,223,723.

(51) Int. Cl.
| | |
|---|---|
| *G06Q 30/00* | (2012.01) |
| *G06Q 30/06* | (2012.01) |
| *G06Q 40/02* | (2012.01) |
| *G06Q 30/02* | (2012.01) |
| *G06F 40/30* | (2020.01) |
| *G06F 40/284* | (2020.01) |
| *H04L 12/58* | (2006.01) |

(52) U.S. Cl.
CPC ....... *G06Q 30/0619* (2013.01); *G06F 40/284* (2020.01); *G06F 40/30* (2020.01); *G06Q 30/0281* (2013.01); *G06Q 40/02* (2013.01); *H04L 51/02* (2013.01)

(58) Field of Classification Search
CPC .............................................. G06Q 30/06–08
USPC ............................................... 705/26.1–27.2
See application file for complete search history.

(56) References Cited

U.S. PATENT DOCUMENTS

| | | |
|---|---|---|
| 8,515,828 B1 | 8/2013 | Wolf et al. |
| 10,223,723 B1 * | 3/2019 | Bodapati ............... G06F 40/284 |
| 2014/0258007 A1 | 9/2014 | Calman et al. |
| 2015/0032538 A1 | 1/2015 | Calman et al. |

* cited by examiner

*Primary Examiner* — Ethan D Civan
(74) *Attorney, Agent, or Firm* — Harrity & Harrity, LLP

(57) ABSTRACT

A device may receive user data associated with a product or service, the user data including a user identifier associated with a user. The device may identify a business application that is relevant to the product or service, the business application being designed to provide the user with a business offer related to the product or service. In addition, the device may provide the user data to the business application and receive, from the business application, business application state data and user response data, the business application state data specifying a partially completed transaction associated with the product or service, and the user response data including information associated with the partially completed transaction. The device may store the business application state data and the user response data, and perform an action based on the business application state data.

20 Claims, 7 Drawing Sheets

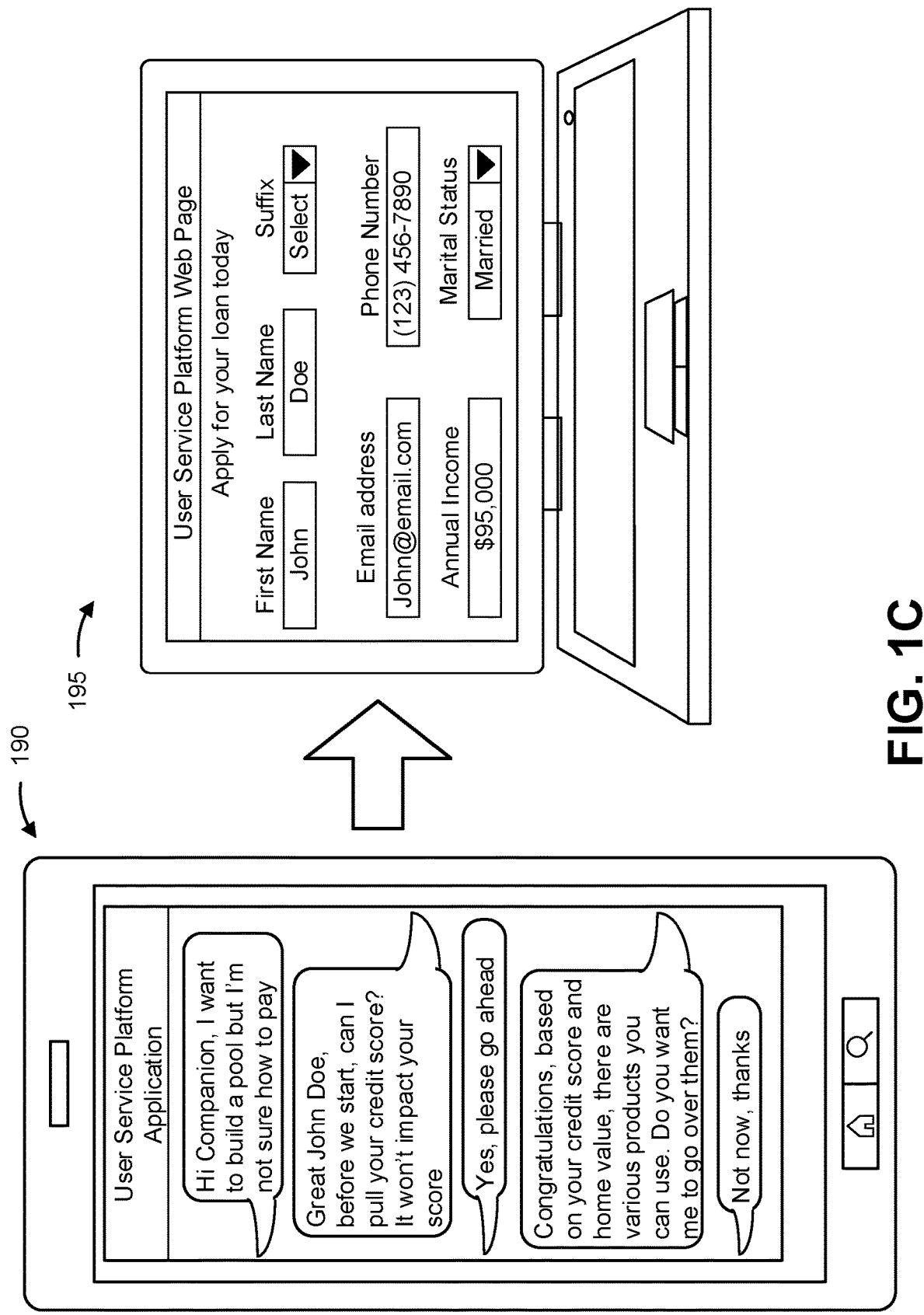

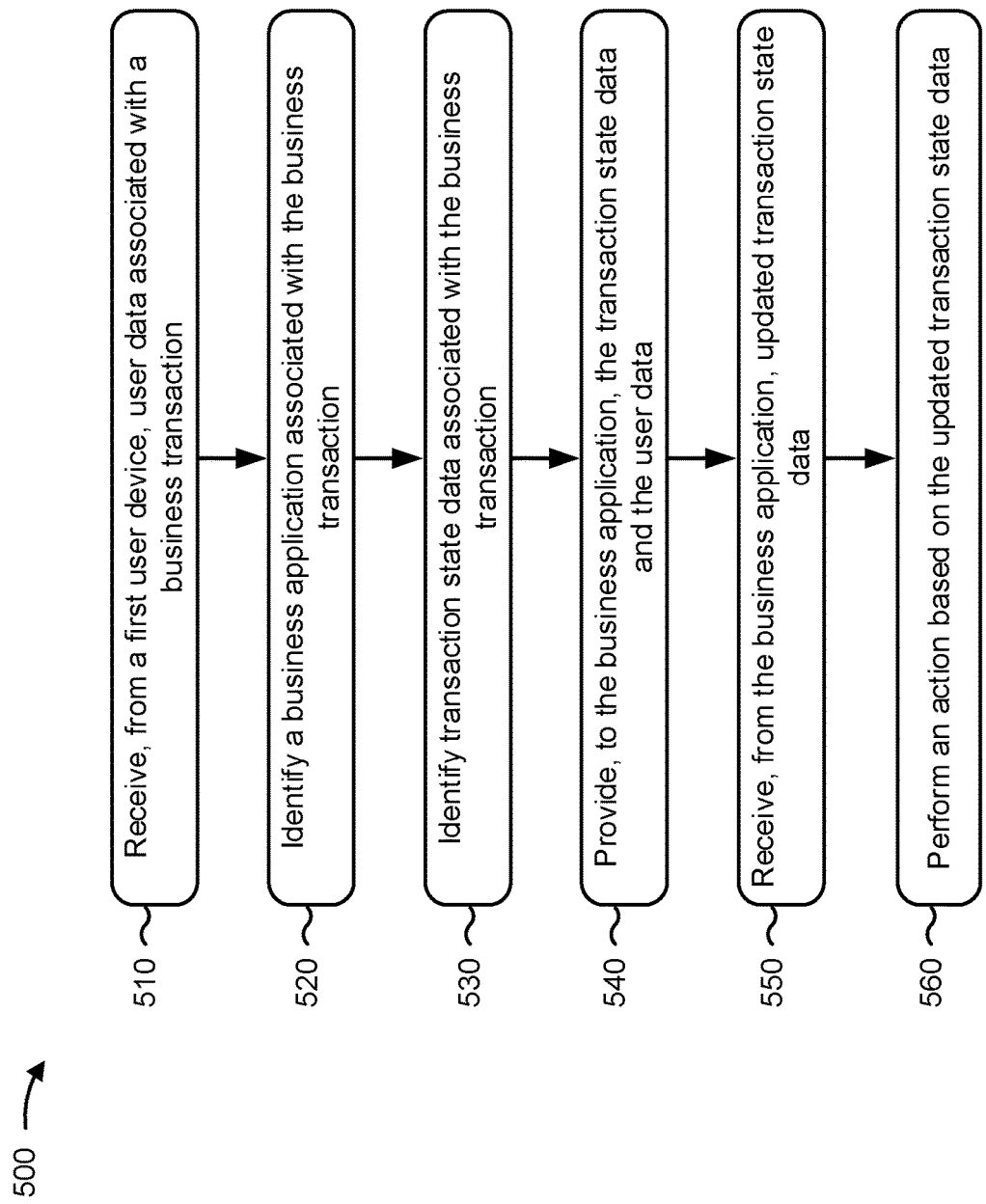

MANAGING TRANSACTION STATE DATA

RELATED APPLICATION

This application is a continuation of U.S. patent application Ser. No. 15/971,170, filed May 4, 2018 (now U.S. Pat. No. 10,223,723), which is incorporate herein by reference.

BACKGROUND

Business entities often offer products or services to consumers through a variety of different channels, including retail locations, online storefronts, software applications, and/or the like. Typically, a business entity conducts a transaction with a consumer after being approached by the consumer, or through solicitation that results in a transaction.

SUMMARY

According to some implementations, a method may comprise: receiving, by a device, user data associated with a product or service, the user data including a user identifier associated with a user; identifying, by the device, a business application that is relevant to the product or service associated with the user data, the business application being designed to provide the user with a business offer related to the product or service; providing, by the device, the user data to the business application; receiving, by the device and from the business application, business application state data and user response data, the business application state data specifying a partially completed transaction associated with the product or service, and the user response data including information associated with the partially completed transaction; storing, by the device, the business application state data and the user response data; and performing, by the device, an action based on the business application state data.

According to some implementations, a device may comprise: one or more memories; and one or more processors, communicatively coupled to the one or more memories, configured to: receive, from a first user device, user data associated with a business transaction, the user data including a user identifier associated with a user, and the business transaction being associated with a product or service; identify a business application associated with the business transaction, the business application being designed to provide the user with a business offer related to the product or service; identify transaction state data associated with the business transaction, the transaction state data including data previously provided by a second user device associated with the user identifier; provide, to the business application, the transaction state data and the user data; receive, from the business application, updated transaction state data, the updated transaction state data including information regarding the business transaction; and perform an action based on the updated transaction state data.

According to some implementations, a non-transitory computer-readable medium may store instructions, the instructions comprising: one or more instructions that, when executed by one or more processors, cause the one or more processors to: receive user data, the user data being associated with a user identifier; identify a product or service relevant to the user data; identify a first user device associated with the user identifier; provide, based on the product or service, business offer data to the first user device, the business offer data including information relevant to the product or service; receive, from the first user device, business transaction data associated with the business offer data; store the business transaction data in a data storage device; receive second user data, the second user data being associated with the user identifier; obtain the business transaction data from the data storage device; identify a second user device associated with the user identifier; and provide, to the second user device, updated business offer data based on the business transaction data, the updated business offer data being based on the business transaction data.

BRIEF DESCRIPTION OF THE DRAWINGS

FIGS. 1A-1C are diagrams of overviews of example implementations described herein;

FIG. 5 is a flow chart of an example process for managing transaction state data.

DETAILED DESCRIPTION

Figure 1A:
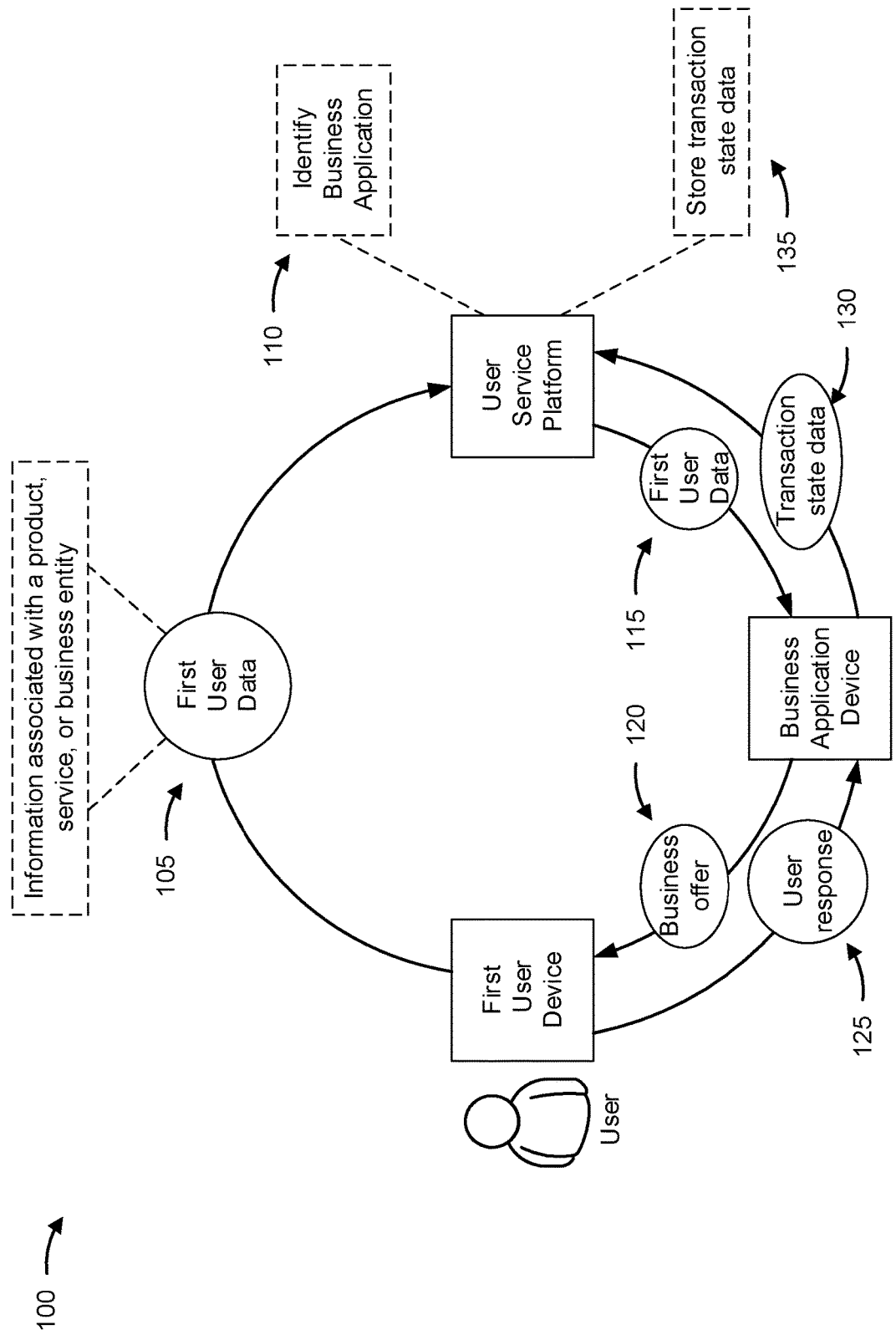

The following detailed description of example implementations refers to the accompanying drawings. The same reference numbers in different drawings may identify the same or similar elements.

Business entities often conduct transactions with consumers by providing consumers with a product and/or service. The transactions may be initiated by the consumers (e.g., by going to a retail location associated with a business entity, using a computing device to shop on a website associated with the business entity, and/or the like) or, in some situations, initiated by the business entity (e.g., telephone solicitation, Internet advertisements to attract individuals to a website associated with the business entity, and/or the like). In most situations, business entities have limited information regarding a potential customer. In addition, many transactions, if they are to occur, occur during a single interaction (e.g., a single retail location visit, single telephone call, single website visit, and/or the like), and attempting to re-engage a consumer regarding an incomplete transaction, at a later time, may be difficult for the business entity and inconvenient for the consumer.

Some implementations, described herein, provide a user service platform (e.g., a server computer, cloud computing platform, and/or the like) that facilitates the performance of transactions between users (e.g., consumers) and business entities using stateful management of transaction data. For example, the user service platform may receive, from a user device (e.g., a user's smart phone, laptop computer, desktop computer, and/or the like), user data that is associated with a product or service. Using the user data, the user service platform may identify a business application device (e.g., a device that includes an application associated with a business and is capable of handling a transaction with the user) relevant to the product or service associated with the user data. The user service platform may provide the business application device with the user data, enabling the business application device to provide the user with an offer and conduct a transaction with the user. In a situation where the transaction between the business application device and user is not completed, the user service platform may obtain information associated with the transaction (e.g., a state of the transaction, information provided by the user device and associated with the transaction, and/or the like), and that information may be stored by the user service platform. At a later time, the user service platform may receive (e.g., from the same communications channel used to provide the user data, or a different communications channel) second user data from the same user device (or a different user device associated with the same user), and the user service platform may use the second user data to obtain the information associated with the prior, partially completed, transaction, and provide that information to the business application device, enabling the business application device to continue the prior transaction with the previously provided user data and transaction state data, as if the flow of the transaction was not interrupted.

In this way, the user service platform may enable business entities (e.g., associated with business application devices) to both find and contact users who may be interested in products and/or services associated with the business entities. In addition, by storing information associated with a partially complete transaction, the user service platform may enable business entities to continue partially complete transactions with users, in a manner that is convenient and efficient for both the user and the business entity. For example, the user experience may be enhanced by making a user aware of products and/or services that the user might not have otherwise been aware of, by providing the user with products and/or services that are relevant to the user, by saving information that was previously provided by the user (e.g., obviating the need to re-enter previously provided information), by enabling the user to be contacted regarding a partially complete transaction at a time and place convenient for the user, and/or the like.

In addition to the enhanced business entity and user experience, the user service platform also conserves both computing and human resources for a business entity and/or an entity managing the user service platform. For example, resources may be conserved by limiting contact with users for whom relevant user data is not available. Computing resources may be conserved, including storage, memory, and processing resources, by saving state information regarding transactions (e.g., both business entity state information and previously provided user data), obviating the need to re-use computing resources to re-do partially completed transactions. In some implementations, the user service platform may also facilitate verification and/or correction of user information (e.g., by using previously provided user information to verify and/or correct later provided user information). This may further facilitate enhancing the user experience and conservation of resources, e.g., by correcting and/or verifying user information, obviating the need to potentially redo or cancel transactions involving incorrect or unverified user information.

Figure 1B:
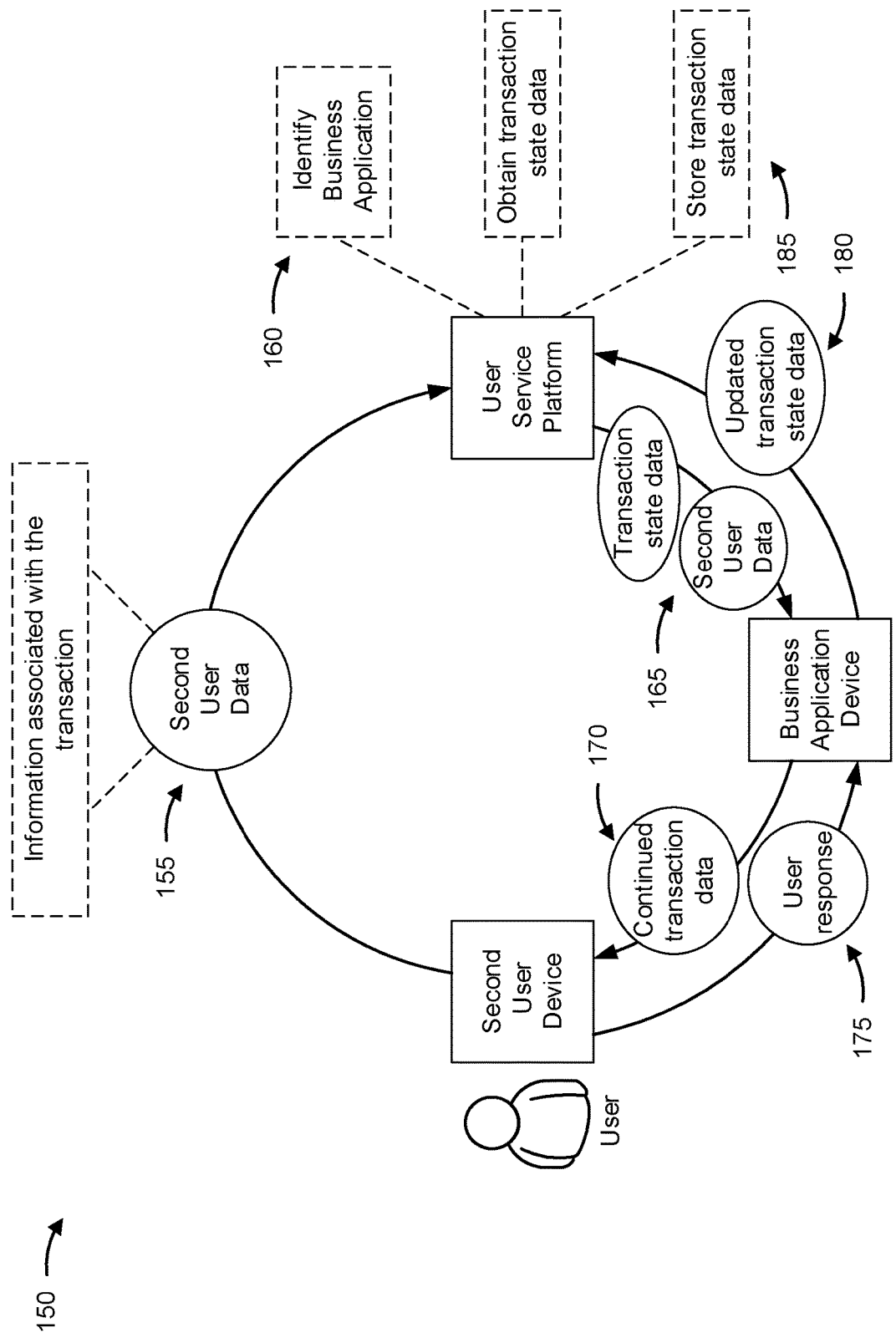

FIGS. 1A-1C are diagrams of overviews of example implementations 100 and 150, described herein. As shown in FIG. 1A, example implementation 100 includes a first user device (e.g., a personal computer, mobile phone, Internet of Things (IoT) device, and/or the like), a user service platform (e.g., a server computer, cloud computing platform, and/or the like), and a business application device (e.g., a server computer, cloud computing platform, and/or the like). While depicted separately in implementation 100, in some implementations, the user service platform and the business application device may be implemented together, e.g., in a single device or platform (e.g., a single server computer or on the same cloud computing platform).

As shown by reference number 105, the user service platform receives first user data from the first user device. The first user data includes information associated with a product or service, and may also include information relevant to the user and/or first user device (e.g., a user identifier associated with the user and/or a user account associated with the user). The first user data may be received through a variety of channels and may include a variety of types of information. For example, the first user data may be provided to the user service platform via a network (e.g., the Internet, a private network, and/or the like) through an application operating on the first user device (e.g., a smart phone application, an IoT device application, a web browsing application, and/or the like).

The first user data may include any information that is relevant to a product or service. The relevance of the information to the product or service may be implicit or explicit, and may be determined by the user service platform in a variety of ways. For example, the information included in the first user data may include: data identifying a particular product or service, such as a user request (e.g., telephone request, electronic mail request, chat request, and/or the like) for information regarding a particular product or service, geographic data that is associated with a location associated with a product or service (e.g., Wi-Fi data indicating a location, global positioning satellite (GPS) data, and/or the like), user activity data (e.g., spending activity associated with a user spending account, web browser application browsing history, leisure activity associated with an application operating on the first user device, and/or the like). The information provided to the user service platform may, in some implementations, depend on user permissions and/or settings that specify, for example which types of information are to be made available to the user service platform.

By way of example, the first user data may include: web browsing application data indicating that the user has recently been shopping for a car on the Internet, GPS location data indicating that the user has recently visited one or more locations associated with car sales, and/or a recent inquiry sent to a bank regarding an automobile loan. The user service platform may associate the foregoing pieces of information with a product or service, such as an automobile, an automobile loan, automobile insurance, and/or the like. In some implementations, the first user data may include explicit information associated with a product or service (e.g., the first user data may include a user request for information regarding an automobile loan). The first user data may be sent by the first user device passively (e.g., based on the user opting in to having an application operating on the first user device submit information to the user service platform) and/or based on user activity (e.g., based on the user providing information specifically to the user service platform).

In some implementations, the first user data may come from a device other than a user device. For example, the user service platform may obtain the first user data from a third party device, such as obtaining web history data from third party device that stores web browsing history for the user, application log data for various applications from application servers associated with the applications, user spending activity from a user spending account organization (e.g., the user's bank, credit card company, and/or the like), user location data from devices associated with retail locations that track user visits, and/or the like. As with the information provided by the first user device, the information provided by third party devices may, in some implementations, be subject to user preferences or settings regarding the sharing of information with the user service platform.

In some implementations, the user service platform may identify a product, service, user intent, user goal, and/or the like, associated with the information included in the first user data using semantic analysis techniques. For example, the user service platform may identify relevant products or services based on the detection of keywords included in text associated with the user data, or by performing one or more machine-learning based techniques to derive the meaning associated with text included in the first user data (e.g., latent semantic indexing, semantic matching, and/or the like). In this situation, the user service platform may perform the semantic analysis, or the user service platform may make use of a third party semantic analysis device for some or all of the semantic analysis used to determine products, services, user intent, user goals, and/or the like, that might be related to information included in the first user data. Determining user intent or user goal may, for example, enable the user service platform to determine products and/or services that might be relevant to the user intent and/or user goal (e.g., in a situation where user intent is to buy a new automobile, a relevant product may be an automobile loan, and a relevant service may be a credit review service).

In this way, the user service platform may receive a variety of information associated with a product or service that might be relevant to the user, enabling the user service platform to facilitate a business offer, transaction, and/or the like, between the user and a relevant business entity.

As shown by reference number 110, the user service platform identifies a business application that is relevant to the product or service. The business application may include any application (e.g., an application operating on the business application device) that is capable of receiving data from the user service platform and using that data to facilitate a business offer, or transaction, with the user. The business application may be managed by the entity that manages the user services platform, or the business application may be managed by a separate entity. Using the automobile shopping example, above, example business applications may include: an automobile loan application (e.g., associated with an automobile loan business entity), an automobile sales application (e.g., associated with an automobile sales business entity), an automobile insurance application (e.g., associated with an automobile insurance business entity), and/or the like.

The user service platform may identify the business application in a variety of ways. In some implementations, identification of the business application may be performed in a manner the same as or similar to the manner in which the user service platform identifies the product or service associated with the information provided in the first user data. For example, business applications may be associated with keywords, which may correspond to products and/or services that are identified as being associated with the first user data. For example, in a situation where the user service platform received information associated with an automobile loan, the user service platform may use that information to identify a business application associated with automobile loans. In some implementations, the user service platform may identify the business application using one or more machine learning techniques designed to identify a product, service, business application, and/or the like, based on information regarding the user's intent, or goal, as identified from the first user data (e.g., based on keywords, the communications channel through which the first user data was provided, and/or the like).

In some implementations, each product or service may be associated with one business application, in which case the user service platform may identify the associated business application. In some implementations, multiple business applications may be associated with an identified product or service. For example, multiple business applications may exist associated with automobile loans (e.g., multiple automobile loan business entities, each having a business application for automobile loans), and/or multiple business applications may be relevant to a product or service (e.g., for an automobile product, an automobile sales application, automobile loan application, automobile insurance application, and/or the like, may all be relevant). In this situation, the user service platform may select a business application from multiple business applications in a variety of ways. For example, the user service platform may choose a business application that most closely matches the identified product or service (e.g., based on semantic analysis, using confidence scores to determine how confident a semantic analysis algorithm is in determining a keyword associated with the product or service matches one or more keywords associated with a business application). Business applications may be associated with a measure of priority (e.g., based on performance ratings, historical user interactions with business applications, user preferences, predetermined priority measures, and/or the like), in which case the user service platform may select the business application with the highest priority when multiple business applications might be relevant to the identified product or service. As another example, business applications may be associated with measures of priority associated with particular products and/or services. In this situation, two business applications might be relevant to multiple products or services, but one of the business applications may have a higher priority for one type of product, while the other business application has a higher priority for a different type of product. The user service platform may use any of the above methods, alone or in combination with the others (or other methods), to identify the business application among multiple potential business applications.

In some implementations, the user service platform may identify the business application, among one or more available business applications, by providing available business applications with data that enables the business applications to provide information indicating an interest in being selected as the business application associated with the product or service. By way of example, in the automobile product situation, the user service platform may send some or all of the information included in the first user data to multiple business entities (e.g., via business application devices) associated with automobiles, enabling the business entities to indicate an interest in being selected as the business application to make a business offer to the user. In a situation where multiple business entities respond indicating an interest, the user service platform may select from the multiple business entities (e.g., in a manner similar to the selection methods provided above, such as priority based selection, bid-based selection, and/or the like).

In some implementations, the user service platform may identify the business application, among multiple available business applications, based on user input. For example, the user service platform may provide the first user device with data that causes the first user device to display one or more available business applications, enabling the user to select, via user input, a relevant business application. By way of example, in a situation where the user service platform identifies three business applications relevant to the first user data, the user service platform may select one of the three business applications based on user input.

In this way, the user service platform may identify a business application associate with the product or service, enabling the user service platform to provide a business application device with information enabling the business application device to provide a business offer to the user and/or initiate a transaction with the user.

As shown by reference number 115, the user service platform provides, to the business application device, information associated with the first user data. In some implementations, the user service platform provides the business application with a portion or all of the first user data (e.g., the information provided to the user service platform by the first user device). In some implementations, the user service platform provides the business application with other information related to the first user data, such as information related to the product or service, or other information regarding the user that might be available to the user service platform. As noted above, while the business application device is depicted separately from the user service platform, in some implementations the business application device may be implemented in the user service platform (e.g., the business application device may be implemented, with the user service platform, in a single cloud computing environment).

Using the automobile loan product example above, the user service platform may provide the business application device with information identifying the user and/or the first user device (e.g., a user identifier, a phone number, a network address, and/or the like), and the information used to determine that the information included in the first user data was associated with an automobile loan (e.g., web history data associated with automobile websites, key words included in a search engine session, chat logs associated with a bank automobile loan specialist or chat bot, and/or the like). In some implementations, the user service platform may also provide the business application device with other information associated with the user and/or the first user device. The other information may be stored by the user service platform and/or obtained from a third-party device, such as a third-party application server that stores application information on behalf of the user, a credit monitoring service that provides credit score information for the user, a banking server associated with the user's banking service provider, and/or the like. In some implementations, whether the user service platform obtains and/or provides the information to the business application device may be subject to user preferences or settings regarding the sharing of information with the user service platform, business application device, and/or third party devices.

In this way, user service platform may provide the business application device (e.g., associated with a business entity), with information enabling the business application device to provide a business offer to the user and/or initiate a transaction with the user.

As shown by reference number 120, the business application device provides a business offer to the first user device. The format and content of the business offer, as well as the channel through which the business offer is provided, may depend on the business application implemented by the business application device. In some implementations, the business application device may provide the business offer to the first user device through a channel provided by the user service platform, such as an application managed by the user service platform and installed on the first user device. For example, the user service platform may provide a service application that the user has installed on the first user device (e.g., a smart phone application), and the business application device may provide the business offer through the service application (e.g., either indirectly, by providing the business offer to the first user device via the user service platform, or directly, such as in a situation where the business application device is managed by the same entity as the user service platform). The business application device may provide the business offer to the first user device in other ways, such as a phone call, an electronic mail, a web advertisement, a chat bot, an in-person solicitation (e.g., in a situation where the user visits a retail location associated with the business application device), and/or the like.

By way of example, in the automobile loan product example situation, the business application device may be associated with an automobile loan business, and the business application device may send the first user device a message through a messaging service included in a service application provided by the user service platform. The business offer may be included in the message, such as a chat bot conversation initiated with, "Hello, I see that you have been researching a new automobile purchase. Would you be interested in seeing which automobile loan products we have available?" This example message, or business offer, may be provided through a service application that is installed on the first user device and managed by the user service platform, enabling the user to verify that the business offer is coming from a source associated with the user service platform (e.g., a business offer that the user has opted in to receiving from the user service platform and/or the business entity associated with the business application device).

While the example implementation 100 depicts the business offer being provided to the first user device, in some implementations the business offer may be provided to a different device associated with the user. For example, the user may be associated with multiple user devices (e.g., a smart phone, IoT device, laptop computer, and/or the like), and the business offer may be provided to any of the devices associated with the user. This may be performed, for example, by using a user identifier that is associated with the user and associated with multiple user devices (e.g., associated with a user device's network address, telephone number, and/or the like). As noted above, the information identifying another user device (other than the first user device) may be provided to the business application device by the user service platform. In some implementations, user settings may indicate a preferred device through which the user has indicated the user would prefer to receive business offers, in which case the business application device may provide the business offer to the preferred device. In some implementations, the first user device may not be compatible with a particular type or format of business offer (e.g., an IoT device, such as a smart home speaker, may not be compatible with receiving an offer and conducting a transaction for an automobile loan). In this situation, the business application device may provide the business offer to a compatible device associated with the user.

In this way, the business application device may provide a business offer to the first user device, initiating a transaction between the user of the first user device and the business entity associated with the business application device.

As shown by reference number 125, the business application device receives a user response from the first user device. The information included in the user response may vary, and may depend on the channel used to conduct the transaction, the type of business offer or corresponding transaction, and/or the like. For example, in an implementation where the transaction is conducted using a chat bot associated with a service application, the user response may include one or more text-based messages regarding the transaction, or business offer. The business application device may use chat bot services to have a conversation with the user regarding a product or service, and the conversation may be logged and stored by the business application device as user response data related to the transaction between the user and the business entity associated with the business application device. As another example, a phone call initiated by the business application device may be logged and corresponding user response data (including a portion or all of the conversation between the user and the entity that made the phone call) may be stored by the business application device. As yet another example, a business offer provided as a link to a website (e.g., provided to the user via electronic mail, the service application, and/or the like) may lead the first user device to a website, which may be used to submit user response data to the business application device.

In some implementations, while the business application device is conducting a transaction with the first user device, the business application device may provide the user service platform with a request for additional information associated with the user. For example, while conducting the transaction with the first user device, the business application device may determine that additional user information might be useful to obtain from the user service platform or a third party, such as information not likely to be provided by the user. Using the automobile loan example situation, the business application device may send a request to the user service platform for a credit score associated with the user. In this situation, the user service platform may obtain the credit score (e.g., from previously stored user information, or from a third-party device, such as a credit reporting agency device) and provide the credit score to the business application device, in a manner designed to facilitate the transaction. In some implementations, requesting and/or providing additional user information may be subject to additional security and/or user permissions, preferences, and/or settings. For example, the user may have previously opted in or out of enabling the user service platform to provide additional user information to the business application device. As another example, the user service platform may verify requests for additional user information with the first user device. In this situation, the user service device may provide the first user device with data indicating that additional user information was requested by the business application device, enabling the user of the first user device to respond, indicating whether the user permits the user service platform to provide the business application device with additional user information.

While the example implementation 100 depicts a single business offer and user response, the communications between the business application device and the first user device regarding a transaction may include multiple communications between the business application device and the first user device. In some implementations, the transaction may be completed (e.g., in the automobile loan example situation, the user may apply for, and/or obtain, a loan with the automobile loan business entity associated with the business application device). In some implementations, the transaction may be partially completed (e.g., the user may have provided some of the information necessary to apply for an automobile loan, but not all of the information required by the business application device).

As shown by reference number 130, the user service platform receives transaction state data from the business application device. The transaction state data may include a variety of information relevant to the transaction between the business application device and the first user device. For example, the transaction state data may include the user response data, including a portion or all of the information provided by the user during the transaction (partial or complete). As another example, the transaction state data may include business application state data that indicates the state of the transaction. The state of the transaction may define, for example, a point or portion of the transaction. By way of example, using the automobile loan example, the transaction of applying for a loan may have multiple states, such as a starting state where no user information has been obtained, a second state where user name and contact information has been obtained, a third state where co-signer information has been obtained, a fourth state where loan term option information has been obtained, and so on, through a complete state where the transaction has been completed. In this situation, the business application state data included in the transaction state data may indicate at which point in the automobile loan application process the transaction was interrupted, or ended. While the example transaction above is associated with an automobile loan application, other types of transactions may have additional states, fewer states, and/or different states, and, in some implementations, the definition of a transaction may vary (e.g., in the automobile loan context, a business entity may consider an automobile loan application a completed transaction, while another business entity may consider the automobile loan application a partial transaction, where closing of the automobile loan is considered a completed transaction).

As shown by reference number 135, the user service platform stores the transaction state data (e.g., the user response data and the business application state data). The transaction state data may be stored, for example, in local and/or network storage available to the user service platform. The transaction state data may be stored in a variety of devices and/or data structures. For example, the transaction state data may be stored in a database included in or otherwise accessible to the user service platform. The transaction state data may be stored as a database record (e.g., partially filled database record), a JavaScript Object Notation (JSON) object, an array object, and/or the like. By way of example, transaction state data associated with an automobile loan, stored in a JSON, may include data structures for storing a variety of information received from the user (e.g., user response data, such as personal identifying information, address information, contact information, preferences regarding reminders, and/or the like), and information associated with the automobile loan application (e.g., an application identifier, an activity identifier identifying a state of the automobile loan transaction, data identifying a chat bot associated with the application, data identifying a transaction start time, data identifying a transaction end time, and/or the like), and/or other information relevant to the automobile loan transaction. The transaction state data may be stored for completed transactions and/or partially completed transactions. Transaction state data for completed transactions (including transactions that were cancelled), may be used, for example, for future business offers and/or transactions, or may be used in a situation where a user changes their mind about a cancelled transaction. Transaction state data for partially completed transactions may be used, for example, to facilitate completion of the transaction.

In some implementations, transaction states may be associated (e.g., in transaction state data) with applications using activity identifiers (e.g., each state of a transaction may be associated with a corresponding unique activity identifier that indicates the state of the transaction), which may enable various actions based on the activity identifiers data (e.g., enabling users to continue from a transaction state, redo a transaction from a particular state, cancel a transaction at a particular state, switch states, and/or the like). In some implementations, and as described in further detail, below, the transaction state data may be integrated with machine learning models to facilitate providing alerts, notifications, and/or the like, which may notify users to complete a transaction, start a new transaction, and/or the like, based on transaction depth (e.g., transaction state progress) associated with the corresponding activity identified in transaction state data.

Based on the stored transaction state data, the user service platform may perform a variety of actions. For example, the user service platform may send, to a device (e.g., first user device, another user device associated with the user, a device associated with business application device, and/or the like) data associated with the transaction state data, such as data indicating that the user service platform is storing the transaction state data, data indicating information included in the transaction state data (e.g., transaction progress), and/or the like. In some implementations, the user service platform may use machine learning to determine which action(s) is/are to be taken. For example, using machine learning, the user service platform may be able to identify a preferred channel through which the user should be contacted for particular types of transactions (e.g., a mobile device may be preferred for one type of transaction, while a personal desktop computer may be preferred for another type of transaction).

In some implementations, the user service platform may identify a triggering event based on the transaction state data (e.g., based on the user response data and/or the business application state data). The triggering event is designed to facilitate continuing a transaction associated with the transaction state data and/or initiate a new transaction. For example, in a situation where the transaction state data is associated with a partially complete transaction the triggering event may be designed to enable the user and the business entity associated with the business application device to continue the partially complete transaction at the exact point where the transaction was interrupted. In a situation where the transaction state data is associated with a complete or cancelled transaction, the triggering event may be designed to enable the user and a business entity associated with another business application device to conduct a transaction (e.g., a transaction related to the transaction for which the transaction state data was stored). Continuing the transaction, or initiating a new transaction, may be performed by the user service platform, for example, by sending data to the business application device that causes the business application device to continue the transaction (e.g., via communications with the first user device or another device associated with the user), and/or sending data regarding a partially completed or new transaction to the first user device (e.g., via the service application). In some implementations, the user service platform may provide the first user device (e.g., via the service application) with data that causes the first user device to cause a partially complete transaction to continue, or a new transaction to be initiated.

In some implementations, the triggering event may be based on a period of time. For example, the triggering event may be the passing of a predetermined period of time or the time being within a predetermined time range, such as a time provided by the user (e.g., in user response data) or business entity associated with the transaction. As another example, the triggering event may be based on information associated with the user, such as a schedule associated with the user. By way of example, the first user device may provide (e.g., directly to the user service platform, in user response data provided to the business application device, via a calendar or scheduling application operating on the first user device, and/or the like) information regarding the user's schedule for a particular period of time, and the user service platform may identify, as a triggering event, a particular time associated with a portion of the user's schedule that is likely to be available. In this way, the user service platform may use a time-based triggering event to send data causing the transaction to continue (or the beginning of a new transaction) at a time that is likely to be convenient for the user.

In some implementations, the triggering event may be based on a geographic location associated with the first user device, or with another device associated with the user (e.g., using the user identifier). For example, the triggering event may occur based on the first user device being determined to be at a particular geographic location. As with the time-based triggering event, the geographic location based triggering event may be predetermined (e.g., based on information provided by or associated with the user, or information provided by the business application device). The geographic location of the first user device may be determined, for example, by an application operating on the first user device (e.g., a GPS application, the service application, and/or the like). By way of example, using the automobile loan example, a partially completed automobile loan application may be associated with a triggering event that causes the user service platform to send data (e.g., via the service application) reminding the user about the partially complete automobile loan application when the first user device is associated with a geographic location associated with the user's home (e.g., previously provided by the user and/or based on information associated with the user that is available to the user service platform). As another example, after completion of an automobile loan transaction, the user service platform may identify a triggering event, based on time, that causes a business application device associated with an automobile insurance entity to initiate a transaction (e.g., provide a business offer) to the user (e.g., at the first user device) for an automobile insurance product that may be relevant to the user.

By storing transaction state data and taking action based on the transaction state data, the user service platform may facilitate both users and business entities with conveniently and efficiently conducting transactions, including enabling the continuation of partially complete transactions, as described in further detail in FIG. 1B.

As shown in FIG. 1B, example implementation 150 includes a second user device (e.g., a personal computer, mobile phone, Internet of Things (IoT) device, and/or the like) associated with the user, the user service platform, and the business application device. The example implementation depicts an example of the continuation of a partially complete transaction between the user and the business entity associated with the business application device. Similar operations may be performed to facilitate a new transaction based on transaction state data associated with a previously completed transaction.

As shown by reference number 155, the user service platform receives second user data associated with the transaction (e.g., the partially complete transaction of example implementation 100). The second user device is different from the first user device, and may be associated with the user, for example, using a user account, user identifier, and/or the like. The information used to determine that the second user device is associated with the same user may be included in the second user data (e.g., a user identifier included in the second user data, or data identifying, to the user service platform, that the second user device is associated with the same user as the first user device). While the example implementation 150 depicts a second user device, in some implementations the first user device may provide the second user data, enabling the transaction to be continued on the first user device.

The second user data may include any information relevant to the transaction, and any information that might have been included in the first user data, including a request for continuing the transaction, or additional data relevant to the transaction (e.g., a relevant search query recorded in search engine history associated with the second user device). In some implementations, the second user data includes information associated with a triggering event, such as time-based information and/or geographic location based information. For example, the second user data may include GPS location data indicating that the second user device is at a geographic location associated with a triggering event. In some implementations, a service application (e.g., provided by the user service platform) may have triggered the second user device to transmit the second user data based on the triggering event being associated with the service application operating on the second user device. In some implementations, the second user device may periodically provide geographic location information to the user service platform, enabling the user service platform to determine when a geographic location based triggering event has occurred.

By way of example, using the automobile loan example, the service application operating on the second user device may include information identifying a triggering event based on geographic locations associated with automobile dealerships. In response to determining (e.g., via a mapping application operating on the second user device) that the second user device is located at an automobile dealer, the service application may send second user data to the user service platform, the second user data including a user identifier associated with the user and information identifying the partially complete transaction between the user and the automobile loan entity associated with the business application device.

As shown by reference number 160, the user service platform identifies a business application and obtains transaction state data associated with the transaction. In some implementations, the second user data may identify the business application and/or transaction (e.g., the service application operating on the second user device may provide, in the second user data, data identifying the business application and/or transaction). In some implementations, the user service platform identifies the business application in a manner the same as or similar to the identification of the business application described above, with reference to example implementation 100. For example, based on the second user data including a keyword associated with a business entity, the user service platform may identify a corresponding business entity associated with the keyword and obtain any existing transaction state data associated with the user and the business application device.

As shown by reference number 165, the user service platform provides the business application device with the transaction state data and the second user data. As with providing the first user data to the business application device, the user service platform may provide the business application with a portion or all of the second user data. Providing the transaction state data to the business application device enables the business application device to continue the partially complete transaction where it left off previously (e.g., as described above with respect to example implementation 100). The second user data may include any information that might be relevant to the transaction, including additional user information not included in the second user data. Additional user information may be provided in the same or a similar manner as described above, e.g., with respect to example implementation 100.

By way of example, using the automobile loan example, the transaction state data may include information that enables an automobile loan application operating on the business application device to continue the automobile loan process with the user (e.g., via the second user device). The second user data may include any data relevant to the transaction, such as data identifying the user, an updated credit score (e.g., updated from a previously obtained credit score), and/or the like.

As shown by reference number 170, the business application device provides continued transaction data to the second user device. As shown by reference number 175, the business application device receives user response data from the second user device. Providing the continued transaction data to the second user device, and receiving the user response data from the second user device, may be performed in the same or a similar manner as the business offer and user response data were provided, and respectively received, described above, e.g., with respect to example implementation 100. The channel used for communications between the business application device and the second user device may be the same as or different from the channel used for previous communications regarding the transaction. For example, the transaction may have been initiated using an IoT device associated with the user, and continued later through the service application operating on a smart phone associated with the user.

As shown by reference number 180, the user service platform receives updated transaction state data from the business application device. The updated transaction state data may be similar to the transaction state data described above, e.g., with respect to example implementation 100. For example, the updated transaction state data may indicate that the corresponding transaction has been completed, or cancelled, or that the transaction remains partially complete (e.g., though it may be partially complete at a later state). As shown by reference number 185, the user service platform stores the updated transaction state data. As with the transaction data, the updated transaction state data may be stored in a variety of devices and/or data structures. For example, the updated transaction state data may be stored in a database included in or otherwise accessible to the user service platform. The updated transaction state data may be stored as a database record (e.g., partially filled database record), a JavaScript Object Notation (JSON) object, an array object, and/or the like. In a situation where the transaction is not complete, the user service platform may treat the updated transaction state data in the same or a similar manner as the transaction state data describe above, e.g., with respect to example implementation 100. For example, the user service platform may obtain and store user response data and define one or more triggering events designed to cause the transaction to continue. In a situation where the transaction was completed, the updated transaction information may be useful (e.g., as additional user information) in future transactions, as described above.

In this way, user service platform may facilitate the performance of a transaction between the user and a business entity associated with the business application device, including enabling the continuation of a partially complete transaction and/or identifying a new business offer or potential transaction.

As shown in FIG. 1C, various types of devices, applications, and/or user interfaces may be used for the first and second user devices of example implementations 100 and 150. For example, as shown by reference number 190, a user device may include a smart phone operating a user service platform application. The user service platform application provides chat bot services and depicts the initiation of a transaction associated with a loan product. As shown by reference number 195, another user device may include a laptop computer operating a web browsing application. In this example, user service platform provides a web page that may include user response data, which may be stored by the user service platform as transaction state data and user response data.

In this way the user service platform may enable business entities (e.g., associated with business application devices) to both find and contact users who may be interested in products and/or services associated with the business entities. In addition, by storing information associated with a partially complete transaction, the user service platform may enable business entities to continue partially complete transactions with users, in a manner that is convenient and efficient for both the user and the business entity. For example, the user experience may be enhanced by making a user aware of products and/or services that the user might not have otherwise been aware of, by providing the user with products and/or services that are relevant to the user, by saving information that was previously provided by the user (e.g., obviating the need to re-enter previously provided information), by enabling the user to be contacted regarding a partially complete transaction at a time and place convenient for the user, and/or the like.

In addition to the enhanced business entity and user experience, the user service platform also conserves both computing and human resources for a business entity and/or an entity managing the user service platform. For example, resources may be conserved by limiting contact with users for whom relevant user data is not available. Computing resources may be conserved, including storage, memory, and processing resources, by saving state information regarding transactions (e.g., both business entity state information and previously provided user data), obviating the need to re-use computing resources to re-do partially completed transactions. In some implementations, the user service platform may also facilitate verification and/or correction of user information (e.g., by using previously provided user information to verify and/or correct later provided user information). This may further facilitate enhancing the user experience and conservation of resources, e.g., by correcting and/or verifying user information, obviating the need to potentially redo or cancel transactions involving incorrect or unverified user information.

As indicated above, FIGS. 1A-1C are provided merely as examples. Other examples are possible and may differ from what was described with regard to FIGS. 1A-1C.

Figure 2:
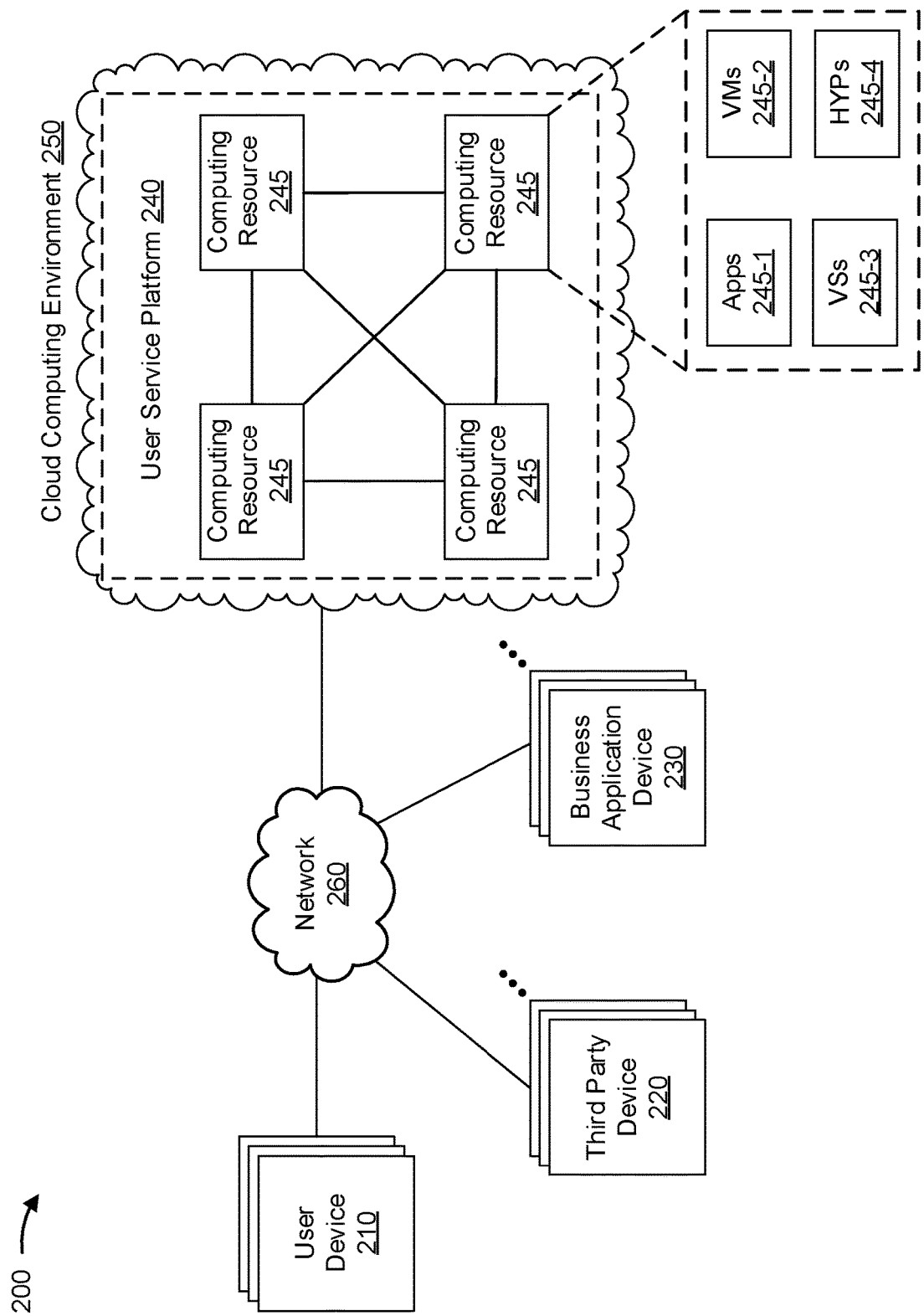
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a third-party device 220, a business application device 230, a user service platform 240, computing resources 245, and a network 260. Devices of environment 200 may interconnect via wired connections, wireless connections, or a combination of wired and wireless connections.

User device 210 includes one or more devices capable of receiving, generating, storing, processing, and/or providing information associated with transactions. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), an IoT device (e.g., a smart speaker, smart thermostat, etc.), or a similar type of device. User device 210 may include hardware, or a combination of hardware and software, that enables user device 210 to communicate with user service platform 240 and business application device 230. For example, user device may include user service platform application, web browsing application, electronic mail application, and/or the like, designed to be used to communication with user service platform 240 and business application device 230.

Third party device 220 includes one or more devices capable of receiving, generating, storing, processing, and/or providing information associated with transactions. For example, third party device 220 may include a server device (e.g., a host server, a web server, an application server, etc.), a data center device, or a similar device. In some implementations, third party device 220 may include a device capable of providing user service platform 240 with information relevant to a user or transaction, such as an application server storing user data, a log storage server storing communications logs associated with a user, a semantic analysis device, or a similar type of device designed to facilitate the management of transaction state data by user service platform 240.

Business application device 230 includes one or more devices capable of receiving, generating, storing, processing, and/or providing information associated with transactions. For example, third party device 220 may include a server device (e.g., a host server, a web server, an application server, etc.), a data center device, or a similar device. Business application device 230 may be associated with (e.g., managed by) a business entity, and be capable of facilitating transactions with a user via user device 210. For example, business application device 230 may include an application server hosting an application used to conduct transaction, a web server capable of enabling user device 210 to conduct transactions, and/or the like. In some implementations, business application device 230 may be included in user service platform 240, and be hosted in a cloud computing environment, such as cloud computing environment 250.

User service platform 240 includes one or more devices capable of receiving, generating, storing, processing, and/or providing information associated with transactions. For example, user service platform 240 may include a server device (e.g., a host server, a web server, an application server, etc.), a data center device, or a similar device. For example, user service platform 240 may be capable of receiving user data from user device 210, providing user data to a relevant business application device 230, and storing information associated with transaction state data for transactions conducted using user device 210 and business application device.

In some implementations, as shown, user service platform 240 may be hosted in cloud computing environment 250. Notably, while implementations described herein describe user service platform 240 as being hosted in cloud computing environment 250, in some implementations, user service platform 240 might not be cloud-based (i.e., may be implemented outside of a cloud computing environment) or might be partially cloud-based.

Cloud computing environment 250 includes an environment that delivers computing as a service, whereby shared resources, services, etc. may be provided to user device 210, business application device 230, or user service platform 240. Cloud computing environment 250 may provide computation, software, data access, storage, and/or other services that do not require end-user knowledge of a physical location and configuration of a system and/or a device that delivers the services. As shown, cloud computing environment 250 may include user service platform 240 and computing resource 245.

Computing resource 245 includes one or more personal computers, workstation computers, server devices, or another type of computation and/or communication device. In some implementations, computing resource 245 may host user service platform 240. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by user device 210. Application 245-1 may eliminate a need to install and execute the software applications on user device 210. For example, application 245-1 may include software associated with user service platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program, and may support a single process. In some implementations, virtual machine 245-2 may execute on behalf of a user (e.g., user device 210), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems, and may manage the execution of the guest operating systems. Multiple instances of a variety of operating systems may share virtualized hardware resources.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
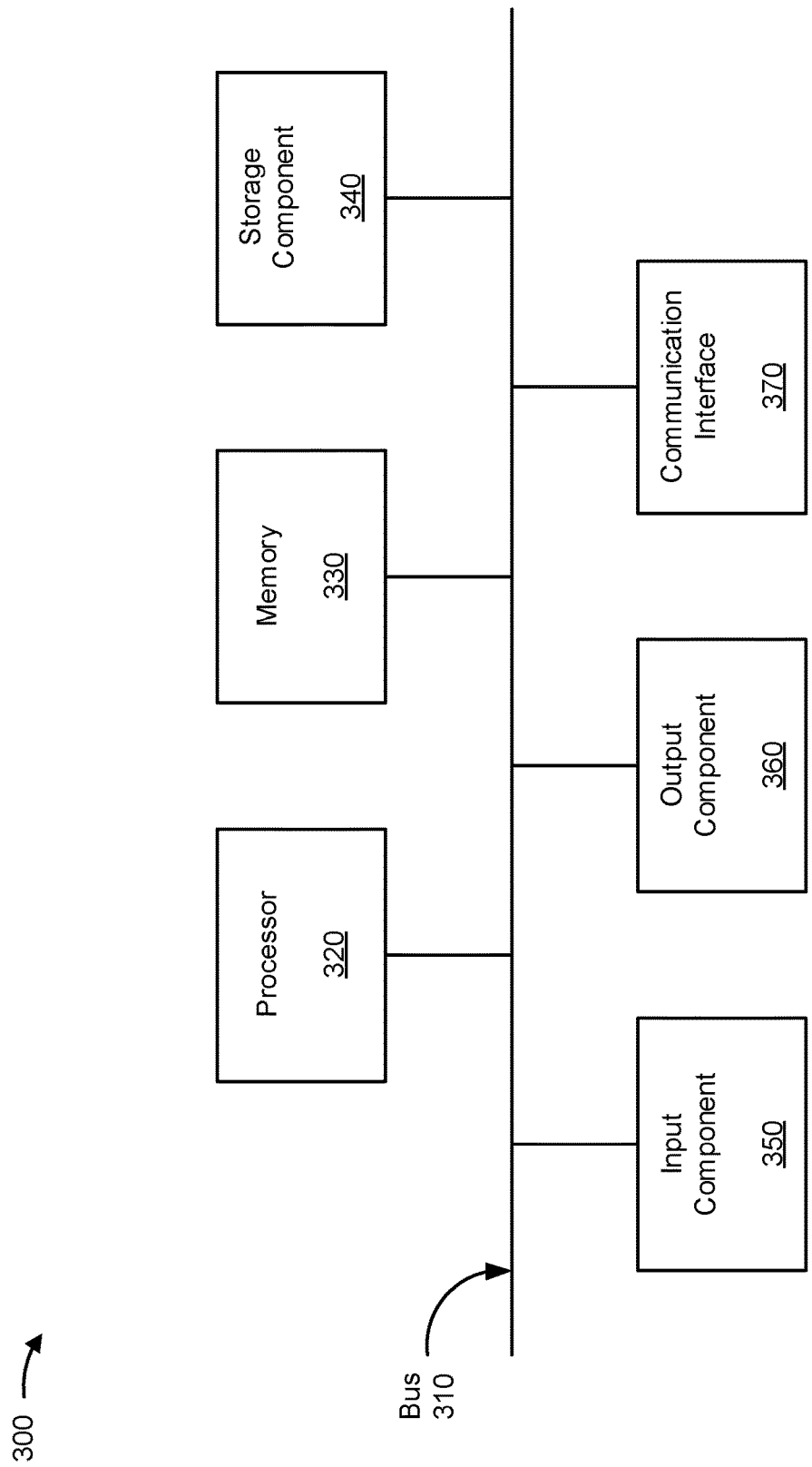
FIG. 3 is a diagram of example components of one or more devices of FIG. 2.

FIG. 3 is a diagram of example components of a device 300. Device 300 may correspond to user device 210, a third-party device 220, a business application device 230, a user service platform 240, and/or computing resources 245. In some implementations, user device 210, a third-party device 220, a business application device 230, a user service platform 240, and/or computing resources 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
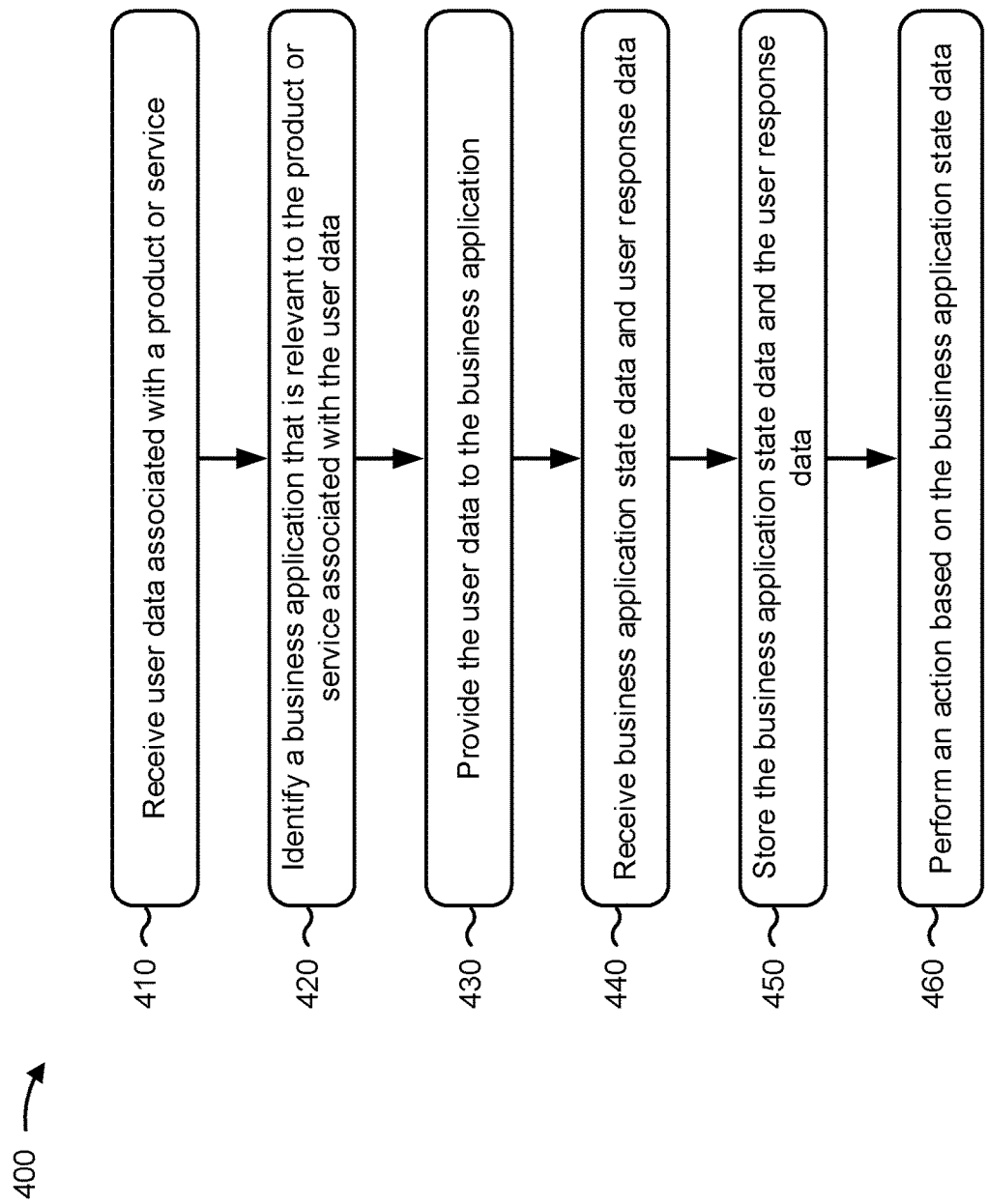
FIG. 4 is a flow chart of an example process for managing data associated with a transaction.

FIG. 4 is a flow chart of an example process 400 for managing data associated with a transaction. In some implementations, one or more process blocks of FIG. 4 may be performed by user service platform 240. In some implementations, one or more process blocks of FIG. 4 may be performed by another device or a group of devices separate from or including user service platform 240, such as user device 210, third party device 220, and/or business application device 230.

As shown in FIG. 4, process 400 may include receiving user data associated with a product or service (block 410). For example, user service platform 240 (e.g., using processor 320, input component 350, and/or communications interface 370) may receive user data associated with a product or service, the user data including a user identifier associated with a user, as described above in connection with FIGS. 1A-1C.

As further shown in FIG. 4, process 400 may include identifying a business application that is relevant to the product or service associated with the user data (block 420). For example, user service platform 240 (e.g., using processor 320, memory 330, storage component 340, output component 360, and/or communications interface 370) may identify a business application that is relevant to the product or service associated with the user data, as described above in connection with FIGS. 1A-1C.

As further shown in FIG. 4, process 400 may include providing the user data to the business application (block 430). For example, user service platform 240 (e.g., using processor 320, output component 360, and/or communications interface 370) may provide the user data to the business application, as described above in connection with FIGS. 1A-1C.

As further shown in FIG. 4, process 400 may include receiving business application state data and user response data (block 440). For example, user service platform 240 (e.g., using processor 320, input component 350, and/or communications interface 370) may receive, from business application device 230, business application state data and user response data, the business application state data specifying a partially completed transaction associated with the product or service, and the user response data including information associated with the partially completed transaction, as described above in connection with FIGS. 1A-1C.

As further shown in FIG. 4, process 400 may include storing the business application state data and the user response data (block 450). For example, user service platform 240 (e.g., using processor 320, memory 330, storage component 340, output component 360, and/or communications interface 370) may store the business application state data and the user response data, as described above in connection with FIGS. 1A-1C.

As further shown in FIG. 4, process 400 may include performing an action based on the business application state data (block 460). For example, user service platform 240 (e.g., using processor 320, memory 330, storage component 340, output component 360, and/or communications interface 370) may perform an action based on the business application state data, as described above in connection with FIGS. 1A-1C.

Process 400 may include additional implementations, such as any single implementation or any combination of implementations described below.

In some implementations, the user data is received from a user device 210 associated with the user identifier. In some implementations, the user data is received from a third-party device 220.

In some implementations, performing the action based on the business application state data may include: identifying a triggering event based on the user response data; and providing, based on an occurrence of the triggering event, data that causes a reminder to be displayed on a user device associated with the user identifier. The reminder may be based on the partially completed transaction. In some implementations, the triggering event is based on a period of time associated with the user identifier. In some implementations, the triggering event is based on a geographic location associated with the user identifier. In some implementations, the user response data was provided by a second user device 210 associated with the user identifier, and the user device 210 is different from the second user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for managing transaction state data. In some implementations, one or more process blocks of FIG. 5 may be performed by user service platform 240. In some implementations, one or more process blocks of FIG. 5 may be performed by another device or a group of devices separate from or including user service platform 240, such as a user device 210, a third-party device 220, and/or a business application device 230.

As shown in FIG. 5, process 500 may include receiving, from a first user device 210, user data associated with a business transaction (block 510). For example, user service platform 240 (e.g., using processor 320, input component 350, and/or communications interface 370) may receive, from a first user device, user data associated with a business transaction, the user data including a user identifier associated with a user, and the business transaction being associated with a product or service, as described above in connection with FIGS. 1A-1C.

As further shown in FIG. 5, process 500 may include identifying a business application associated with the business transaction (block 520). For example, user service platform 240 (e.g., using processor 320, memory 330, storage component 340, input component 350, output component 360, and/or communications interface 370) may identify a business application associated with the business transaction, the business transaction being designed to provide the user with a business offer related to the product or service, as described above in connection with FIGS. 1A-1C.

As further shown in FIG. 5, process 500 may include identifying transaction state data associated with the business transaction (block 530). For example, user service platform 240 (e.g., using processor 320, memory 330, storage component 340, input component 350, output component 360, and/or communications interface 370) may identify transaction state data associated with the business transaction, the transaction state data including data previously provided by a second user device 210 associated with the user identifier, as described above in connection with FIGS. 1A-1C.

As further shown in FIG. 5, process 500 may include providing, to the business application, the transaction state data and the user data (block 540). For example, user service platform 240 (e.g., using processor 320, output component 360, and/or communications interface 370) may provide, to the business application, the transaction state data and the user data, as described above in connection with FIGS. 1A-1C.

As further shown in FIG. 5, process 500 may include receiving, from the business application, updated transaction state data (block 550). For example, user service platform 240 (e.g., using processor 320, input component 350, and/or communications interface 370) may receive, from the business application, updated transaction state data, the updated transaction state data including information regarding the business transaction, as described above in connection with FIGS. 1A-1C.

As further shown in FIG. 5, process 500 may include performing an action based on the updated transaction state data (block 560). For example, user service platform 240 (e.g., using processor 320, memory 330, storage component 340, input component 350, output component 360, and/or communications interface 370) may perform an action based on the updated transaction data, as described above in connection with FIGS. 1A-1C.

Process 500 may include additional implementations, such as any single implementation or any combination of implementations described below.

In some implementations, performing the action based on the updated transaction state data includes storing the updated transaction state data in a log of transaction data associated with the user identifier.

In some implementations, performing the action based on the updated transaction state data includes identifying a triggering event based on the updated transaction state data, the triggering event being associated with providing, to a user device associated with the user identifier, reminder data that is associated with the business transaction. In some implementations, the triggering event includes determining that the user device 210 is located at a particular geographic location. In some implementations, the triggering event includes receiving, from a third-party device 220, information relevant to the business transaction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 400 may be performed in parallel.

In this way, user service platform 240 may enable business entities (e.g., associated with business application devices 230) to both find and contact users who may be interested in products and/or services associated with the business entities. In addition, by storing information associated with a partially complete transaction, the user service platform 240 may enable business entities to continue partially complete transactions with users, in a manner that is convenient and efficient for both the user and the business entity. For example, the user experience may be enhanced by making a user aware of products and/or services that the user might not have otherwise been aware of, by providing the user with products and/or services that are relevant to the user, by saving information that was previously provided by the user (e.g., obviating the need to re-enter previously provided information), by enabling the user to be contacted regarding a partially complete transaction at a time and place convenient for the user, and/or the like.

In addition to the enhanced business entity and user experience, the user service platform 240 also conserves of both computing and human resources for a business entity and/or an entity managing the user service platform 240. For example, resources may be conserved by limiting contact with users for whom relevant user data is not available. Computing resources may be conserved, including storage, memory, and processing resources, by saving state information regarding transactions (e.g., both business entity state information and previously provided user data), obviating the need to re-use computing resources to re-do partially completed transactions. In some implementations, the user service platform 240 may also facilitate verification and/or correction of user information (e.g., by using previously provided user information to verify and/or correct later provided user information). This may further facilitate enhancing the user experience and conservation of resources, e.g., by correcting and/or verifying user information, obviating the need to potentially redo or cancel transactions involving incorrect or unverified user information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   generating, by a device and based on user response data associated with a partially completed transaction, a triggering event;
   identifying, by the device and when the triggering event has occurred, transaction state data associated with the partially completed transaction,
      the partially completed transaction being associated with a user associated with the user response data, and
      the transaction state data indicating that the partially completed transaction is associated with a first transaction state;
   identifying, by the device, a user device associated with the partially completed transaction;
   identifying, by the device, a business application that is relevant to the partially completed transaction; and
   providing, by the device and to the business application:
      the transaction state data,
      data identifying the user device, and
      instructions that cause the business application to perform an action associated with the user device and the partially completed transaction.

2. The method of claim 1, wherein the triggering event comprises at least one of:
   a lapse of a predetermined period of time,
   a current time matching a particular time of day,
   an event associated with a user schedule associated with the user,
   determining that the user device is in a particular geographic location, or
   determining that another device associated with a user is in another geographic location.

3. The method of claim 1, wherein generating the triggering event comprises:
   identifying textual input included in the user response data; and
   generating, based on the textual input, the triggering event, the triggering event including at least one of:
      a time-based triggering event, or
      a geographic-based triggering event.

4. The method of claim 3, wherein generating the triggering event further comprises:
   identifying, in a user schedule associated with the user, a particular time; and
   generating the triggering event based on the particular time.

5. The method of claim 3, wherein determining the triggering event further comprises:
   identifying, in a user schedule associated with the user, a particular geographic location; and
   generating the triggering event based on the particular geographic location.

6. The method of claim 1, wherein identifying a user device associated with the partially completed transaction comprises:
   identifying the user device from previously stored data associating the user device with the transaction state data.

7. The method of claim 6, wherein the user device is different from another device, the other device having previously provided the user response data to the device.

8. A device comprising:
one or more memories; and
one or more processors, communicatively coupled to the one or more memories, configured to:
receive, from a user device, user response data associated with a partially completed transaction;
generate, based on the user response data, a triggering event;
identify, when the triggering event has occurred, transaction state data associated with the partially completed transaction,
the partially completed transaction being associated with a user associated with the user response data, and
the transaction state data indicating that the partially completed transaction is associated with a first transaction state;
identify a business application that is relevant to the partially completed transaction; and
provide, to the business application:
the transaction state data,
data identifying the user device, and
instructions that cause the business application to perform an action associated with the user device and the partially completed transaction.

9. The device of claim 8, wherein the user response data includes data indicating that the partially completed transaction is to be suspended.

10. The device of claim 8, wherein the one or more processors are further to:
generate, in a data structure and based on generating the triggering event, an association between the triggering event and the transaction state data.

11. The device of claim 8, wherein the one or more processors are further to:
receive, from the user device, data indicating that the triggering event has occurred.

12. The device of claim 11, wherein the one or more processors, when receiving data indicating that the triggering event has occurred, are to:
receive, from the user device, geographic information indicating that the user device is located at a particular geographic location associated with the triggering event.

13. The device of claim 8, wherein the one or more processors are further to:
receive, from another user device associated with the user, data indicating that the triggering event has occurred.

14. The device of claim 13, wherein the one or more processors, when receiving data indicating that the triggering event has occurred, are to:
receive, from the other user device, geographic information indicating that the other user device is located at a particular geographic location associated with the triggering event.

15. A non-transitory computer-readable medium storing instructions, the instructions comprising:
one or more instructions that, when executed by one or more processors, cause the one or more processors to:
generate, based on user response data associated with a partially completed transaction, a triggering event;
identify, when the triggering event has occurred, transaction state data associated with the partially completed transaction,
the partially completed transaction being associated with a user associated with the user response data, and
the transaction state data indicating that the partially completed transaction is associated with a first transaction state;
identify a business application that is relevant to the partially completed transaction; and
provide, to the business application:
the transaction state data,
data identifying a user device, and
instructions that cause the business application to perform an action associated with the user device and the partially completed transaction.

16. The non-transitory computer-readable medium of claim 15, wherein the transaction state data includes previous user input provided to the business application by the user device.

17. The non-transitory computer-readable medium of claim 15, wherein the instructions that cause the business application to perform the action further cause the business application to communicate with the user device regarding the partially completed transaction.

18. The non-transitory computer-readable medium of claim 15, wherein the instructions that cause the business application to perform the action further cause the business application to continue the partially completed transaction at the first transaction state.

19. The non-transitory computer-readable medium of claim 15, wherein the instructions that cause the business application to perform the action further cause the business application to provide the user device with data identifying previous user input that was provided to the business application at a previous point in time.

20. The non-transitory computer-readable medium of claim 15, wherein the one or more instructions, that cause the one or more processors to generate the triggering event, further cause the one or more processors to:
identify textual input included in the user response data; and
determine, based on the textual input, the triggering event, the triggering event including at least one of:
a time-based triggering event, or
a geographic-based triggering event.

* * * * *